Oct. 17, 1961  R. H. EATON  3,004,638
FLOATING NUT WITHIN TUBULAR STRUCTURE
Filed Sept. 27, 1957
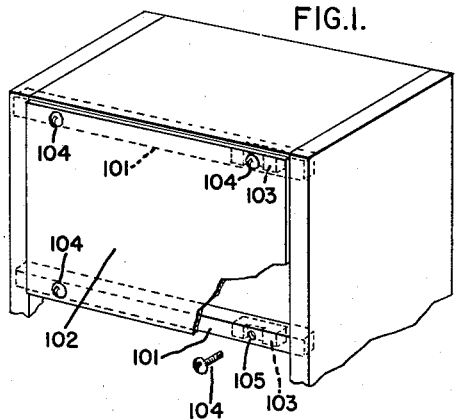
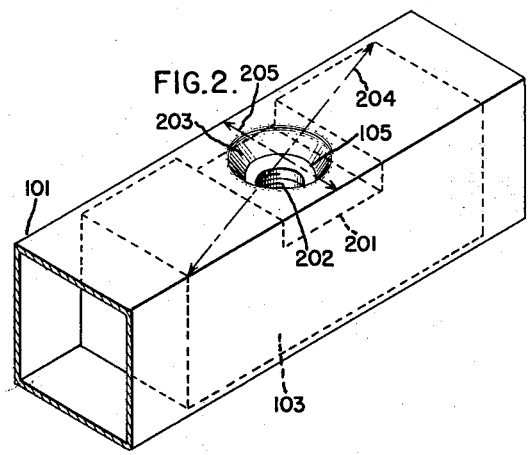
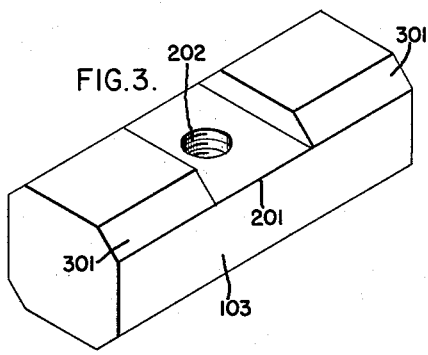
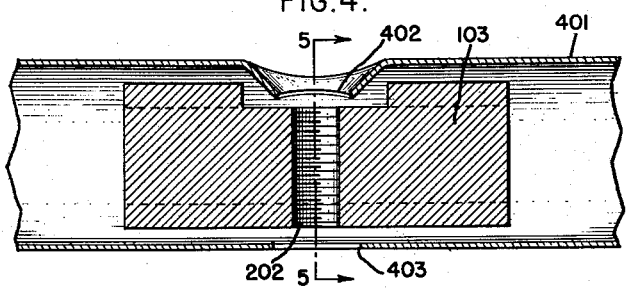
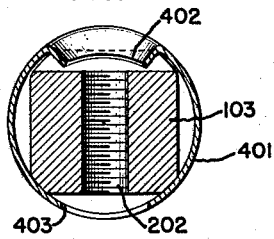
INVENTOR:
RICHARD H. EATON,
BY *Hugo M. Wikstrom*
HIS ATTORNEY.

United States Patent Office 3,004,638
Patented Oct. 17, 1961

3,004,638
FLOATING NUT WITHIN TUBULAR
STRUCTURE
Richard H. Eaton, New Hartford, N.Y., assignor to
General Electric Company, a corporation of New York
Filed Sept. 27, 1957, Ser. No. 686,703
1 Claim. (Cl. 189—36)

This invention relates to the fastening art, and more particularly has reference to improved bolt receiving arrangements adapted for use with tubular framework construction.

In recent years, the high strength to weight ratio of tubular frame members, such as chrome-molybdenum alloy tubing, has resulted in widespread use of such tubing for structural framework. In many forms of construction the use of so-called blind fastenings is necessary, as for example, in electronic equipment where it is desired to removably secure to the frame by means of studs or bolts panels, the edges of which overlap the framework structure. Further, in such construction it is often difficult to maintain exact alignment of the panel holes with the positioned bolt receiving means. Additionally, the use of such tubular frame members requires processing, with which the bolt receiving means should not interfere.

It is, therefore, the primary object of my invention to provide improved method and means for the location of a bolt receiving member within a tubular frame member.

In accordance with this object, I have provided in one embodiment of my invention a bolt receiving member placed in bolt receiving position within a tubular frame member having a clearance hole drilled thereon. The bolt receiving member has a threaded hole extending transversely thereto for receiving a bolt inserted through the clearance hole. A recess is formed on the face of the bolt receiving member adjacent the clearance hole and the material immediately surrounding the clearance hole is upset into the recess to allow limited translational movement of the member in the bolt receiving position. The bolt receiving means is dimensioned to provide sufficient clearance for the flow of processing fluid, but is prevented from rotating by the coaction of the bolt receiving means with the tubular member.

The features of my invention, which I believe to be novel, are set forth with particularity in the appended claim. My invention, itself, however, both as to its organization and method of operation, together with other objects and advantages, may best be understood by reference to the following description taken in connection with the accompanying drawings, in which:

FIGURE 1 is a partially sectioned perspective view of a completed assembly in accordance with one embodiment of my invention.

FIGURE 2 is a perspective view of a portion of the structure shown in FIGURE 1.

FIGURE 3 is a perspective view of one embodiment of a bolt receiving member in accordance with my invention.

FIGURE 4 is a cross section in view of another embodiment of my invention; and

FIGURE 5 is a cross section taken along lines 5—5 of FIGURE 4.

In FIGURE 1 there is shown a framework comprising tubular frame members 101. The frame members may be assembled into a framework structure by any of the means known to the art, such as welding. In order to mount the enclosing panels 102 on the framework, bolt receiving members or blocks 103 are positioned within the tubular members. A bolt 104 extends through the panel, a clearance hole 105 in the tubular member and into a threaded portion of the bolt receiving block 103. The operation of the bolt receiving block may best be understood by reference to FIGURE 2.

In FIGURE 2 there is shown a portion of a frame member 101. The bolt receiving block 103 is inserted within the frame member 101. The bolt receiving block has a recessed portion 201 in one face thereof and a threaded hole 202 extending transversely to said block within said recessed portion. When the threaded hole is aligned with the clearance hole, 105, the material immediately surrounding the clearance hole is upset into the recess 201, as illustrated by the shaded portion 203.

The upset material, coacting with the recess-formed shoulders astraddle the upset material, prevents displacement of the bolt receiving block from its desired bolt receiving location within the tubular frame member while allowing limited translational movement. Thus the block is retained in a position to receive panel securing bolts during subsequent assembly operations. Dimensions of the cross section of the bolt receiving block are smaller than the corresponding internal dimensions of the tubular frame member. The diagonal 204 of the block taken perpendicular to the axis of the threaded hole must, of course, be larger than the dimension 205 of the tubular frame member, also taken perpendicular to the axis of the threaded hole in order to prevent complete rotation of the block during assembly of the screw thereon. However, the cross section of the block is so dimensioned with respect to the cross section of the tubular frame member to give clearance therebetween for multi-axis self alignment and passage for processing fluids. As will be evident to those skilled in the art, the dimensional requirements are not critical and allow block dimensioning such that considerable self alignment of the block with the direction of bolt insertion is possible. This multi-directional alignment feature has been found to simplify assembly of structures employing my invention. The clearance hole may be made sufficiently large to ensure insertability of the bolt.

Further, as will be apparent to those skilled in the art, the feasibility of allowing clearance between the block and the tubular frame member is of great advantage in structure assembly using a welded structure. The necessity of removing corrosive materials used for cleaning and finishing the tubular frame members after welding is not inhibited by the presence of the blocks because of the clearance allowed.

It will be apparent that the block can be formed of known material compatible with the limitations such as strength, of the application, or can be formed by recessing one face of standard, suitable dimensional nuts. The recess should extend beyond the aperture of the threaded hole in the usual case to allow upsetting of material into the recess without need for high precision of upsetting tool penetration.

Although the usual application of my invention will involve tubular frame members of rectangular shape due to the compatibility of such members with structural construction, it will be apparent to those skilled in the art that my invention can easily be adapted for use with tubular frame members of other cross-sectional shape. For example, in FIGURE 3 there is shown an embodiment of my invention adapted for use with round tubular frame members.

In FIGURE 3 there is shown a bolt receiving block 103 having a recessed portion 201 with a threaded hole 202 extending transversely thereto. By beveling the edges to form the surfaces 301, the bolt receiving block is easily adapted for use with round tubular frame members, as is shown in FIGURE 4.

In FIGURE 4 there is shown a frame member 401 having a round cross-sectional shape. Clearance holes 402 and 403 are provided on both sides of the frame member. After the block 103 is inserted within the member so that the threaded hole 202 is aligned with one of the clearance holes 402 or 403, the material surrounding the clearance hole near the recess in the block is upset into the recess. The beveled edges provide the necessary clearance and adapt the block for use with round tubing, as is best shown in FIGURE 5.

As will be apparent to those skilled in the art, only a single clearance hole need be provided instead of the two clearance holes shown in FIGURES 4 and 5. Since the bolt receiving block can rotate before upsetting of the wall material into the recess on the block, in some applications, however, it is advantageous to provide both holes for faster location of the recessed face. Further, use of a screw longer than the diameter of the frame member may be made to furnish a stud for mounting of cable clamps or brackets on the inner side of framework.

It will also be apparent that the bolt receiving block could be cut from extruded stock having a U-shaped cross-section if a large number of such blocks is to be used.

While particular embodiments of the present invention have been shown and described, it will be obvious to those skilled in the art that changes and modifications may be made without departing from the invention in its broader aspects, and, therefore, the aim in the appended claim is to cover all such changes and modifications that fall within the true spirit and scope of the invention.

What I claim as new and desire to secure by Letters Patent of the United States is:

In combination, a circumferentially-continuous rectangular tubular frame member having a clearance hole in one wall thereof, a nut enclosed within and capable of limited lateral movement with respect to said member, said nut having a longitudinal axis parallel to the longitudinal axis of said frame member, said nut having a threaded bore perpendicular to said longitudinal axis and aligned with said clearance hole, said nut having a recess transverse to said longitudinal axis and surrounding said bore in the face of said nut adjacent said clearance hole, said recess being wider than the diameter of said threaded bore and providing transversely extending shoulders, said nut being dimensioned so that a diagonal, taken perpendicular to the axis of said threaded bore, is greater than the transverse dimension of said tubular member taken perpendicular to said threaded bore, and means to limit translational movement of said nut in said bolt receiving position comprising a portion of said wall immediately surrounding clearance hole upset interiorly of said member within said recess and spaced from said shoulders to permit said limited lateral movement.

References Cited in the file of this patent

UNITED STATES PATENTS

| | | |
|---|---|---|
| 894,884 | Hallowell | Aug. 4, 1908 |
| 2,144,350 | Swanstrom | Jan. 17, 1939 |
| 2,191,613 | Ericsson | Feb. 27, 1940 |
| 2,378,257 | Tinnerman | June 12, 1945 |
| 2,379,804 | Johnson | July 3, 1945 |
| 2,633,174 | Poupitch | Mar. 31, 1953 |